Patented Nov. 22, 1938

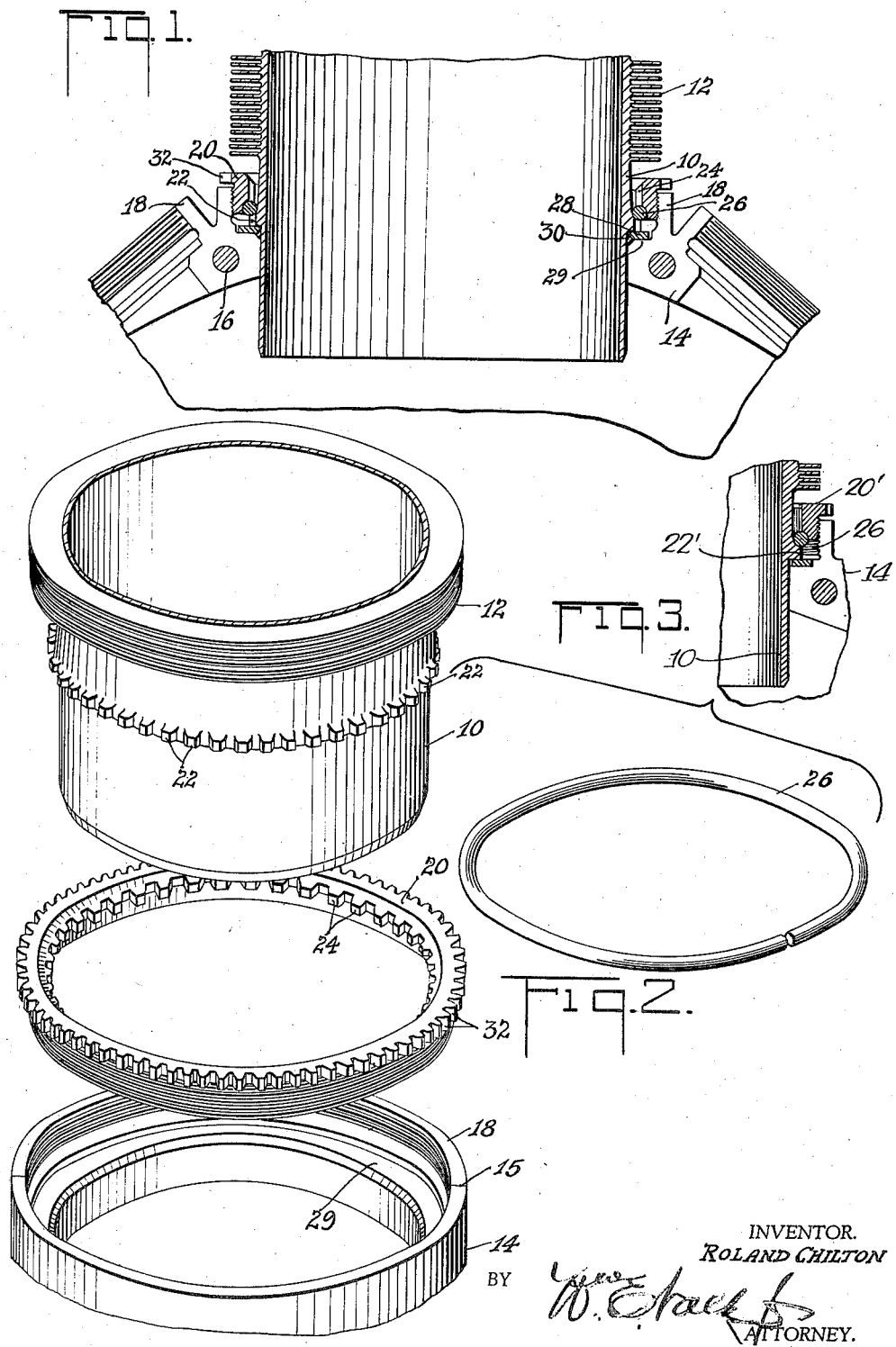

2,137,391

UNITED STATES PATENT OFFICE 2,137,391

CYLINDER ATTACHMENT

Roland Chilton, Ridgewood, N. J., assignor, by mesne assignments, to Wright Aeronautical Corporation, Paterson, N. J., a corporation of New York Application January 9, 1937, Serial No. 119,729

2 Claims. (Cl. 285—25)

This invention relates to an improved attachment or mechanical connection, the specific embodiment of the drawing showing the device applied for attaching a cylinder of an aircraft engine to the engine crankcase.

The usual form of attachment comprises a flange on the cylinder cooperating with nuts screwed onto studs threaded into the crankcase. This form of attachment gets relatively bulky and heavy in high powered engines. For example, one well known fourteen-cylinder engine uses 224 studs and nuts for attaching the cylinders and many of these are in relatively inaccessible positions between adjacent cylinders, which considerably lengthens the time required for assembly and disassembly. Further, the stresses in the cylinder barrel and crankcase are apt to be concentrated around each nut and stud.

Accordingly, objects of the present invention are to avoid the foregoing limitations and to provide a simplified construction which shall be economical in weight and cost and afford relatively uniform stress distribution. Other objects and advantages will be pointed out in, or will be obvious from, the following description, with reference to the drawing, in which:

Fig. 1 is a fragmentary section through a cylinder and crankcase of a radial engine, Fig. 2 is an "exploded" perspective view of the essential parts of the invention, and Fig. 3 is a fragmentary section through a cylinder and crankcase showing an alternative embodiment of the invention.

In the drawing, 10 designates a cylinder having conventional cooling fins 12, the cylinder projecting into a crankcase 14 which is split in the plane of Fig. 1 (at 15 in Fig. 2) and secured by through bolts 16 in the usual way.

Concentric with each cylinder axis, the crankcase is provided with integral annular projections 18 which are internally screw-threaded to receive companion screw-threads on a ring nut 20. The cylinder is provided with a serrated flange 22 and the nut is provided with internal serrations 24 which are adapted to be passed over the serrations 22 of the cylinder barrel. A split ring 26, which may be of circular cross-section, is sprung over the serrated flange 22 of the cylinder after the nut 20 has been passed over the flange 22. The upper side of the flange 22 is made to conform to the profile of the ring as is the lower side of the serrations 24 of the nut 20.

It will be seen that when the nut is screwed home (by the wrench teeth 32) against this ring, the latter is stressed in shear around its whole circumference, the effect of the serrations being to give overlapping abutment faces against the ring and also to materially increase the effective shear area of the ring.

The underside of the flange 22 of the cylinder abuts a suitable shoulder in the crankcase. In this specific instance the abutment comprises a ring 28 abutting a seat 29 in the crankcase 14 as shown, the ring and the crankcase being provided with chamfers to accommodate a sealing ring 30, of soft material, to provide oil tightness.

While the serrated flange embodiment shown in the drawing represents the preferred embodiment of the invention, it may be carried out in a simplified form, as shown in Fig. 3, by using a continuous flange 22' on the cylinder of a diameter equal to mean diameter of the split ring 26 and by similarly forming the inside of the nut 20' to a smooth bore that will just pass over the cylinder flange. In this case, there are apt to be compressive reactions upon the cylinder sleeve which are avoided by the overlapping relations of the serrated members of the preferred embodiment.

I am aware that flange and annular nuts are old in the art, but it will be appreciated that the presence of the fins 12, or other enlargements on the cylinder prevents any conventional ring nut from being assembled into the reduced diameter between these fins and the cylinder flange which the nut is about to abut. In one known construction, this dilemma was overcome by forming the nut initially integral with the cylinder above the cylinder holding flange and then parting the nut from the cylinder material proper, by the use of a slender tool, which still left the necessary excess of flange diameter over the bore of the nut, which thus could not be demounted from the cylinder without spoiling the utility of both. The present invention comprises an improved and simplified means of detachably mounting a ring nut for assembly in abutting relation with a cylinder flange in spite of projections on the cylinder which prevent the assembly of the nut over the upper end thereof.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. The combination with a cylinder and a case, of an annular nut, a flange on the cylinder overlapping the bore of said nut, serrations on said flange and in said bore to permit the nut to be passed into position for assembly, a split ring adapted to retain said nut from re-passing said flange and threads in said case into which said nut is screwed to hold said flange in assembled relation against said case.

2. In combination, a split ring of given mean diameter, a cylinder having a flange of greater diameter, a nut having a flange of lesser diameter, a body means into which said nut is secured for securing the cylinder thereto in assembled relation, and serrations in said flanges whereby one may pass the other when said split ring has been removed.

ROLAND CHILTON.